United States Patent Office

3,553,321
Patented Jan. 5, 1971

3,553,321
STABILIZED CARRIER FOR PESTICIDAL
FORMULATIONS
Robert Zilli, Somerville, and Garth Coombs, Martinsville, N.J., assignors to Johns-Manville Corporation, New York, N.Y., a corporation of New York
No Drawing. Continuation of application Ser. No. 344,240, Feb. 12, 1964. This application Feb. 10, 1967, Ser. No. 615,266
Int. Cl. A01n 9/00, 9/36
U.S. Cl. 424—213                    12 Claims

ABSTRACT OF THE DISCLOSURE

A hydrothermal reaction product useful as a pesticidal carrier and the process of producing the product preferably by hydothermally reacting diatomaceous silica with lime and then reacting therewith carbon dioxide.

---

This application is a continuation of application Ser. No. 344,240, filed Feb. 12, 1964, which is now abandoned.

This invention relates to hydrothermally prepared silica-calcium oxide reaction products, and particularly, to carbon dioxide treatment during the hydrothermal reaction of silica and lime. The carbon dioxide treated silica-calcium oxide reaction products are characterized as substantially inert and find particular application in pesticidal compositions by providing increased availability and/or stability of the active ingredients.

In order for a pesticidal carrier to be acceptable for widespread commercial use, it must not appreciably reduce the activity of the pesticides it carries, it must be substantially nonphytotoxic, and, when formulated with the pesticide, yield a nonphytotoxic product which will not produce any adverse effects to plant life. Additionally, the carrier should have great absorptivity for the proposed pesticide it will carry, as it is highly desirable that the formulated product be free-flowing, or substantially so, in its routine handling. It should be substantially wetted when employed in standard wettable powder formulations, i.e., the carrier, and the formulated product made therefrom must give acceptable results regarding its dispersibility and suspendibility in an aqueous slurry, and must be able to suspend itself and the pesticide it carries without an appreciable tendency for the particles to flocculate.

While many of the known carriers possess some of the necessary characteristics mentioned above, it is the usual observation that some, and frequently many, of the requirements are lacking in the known carrires. This is particularly true where compounds sensitive to chemical or catalytic deactivation are employed. Particularly disadvantageous has been the tendency of known carriers to reduce the pesticidal activity of the pesticide they bear when that pesticide is one of the group known to be sensitive to bases and particularly above a pH of 9.0. Many of the so-called inert natural and synthetic carriers used for pesticidal formulations sometimes react with or prevent the release of the toxicant or other ingredients of the formulations. This has prevented the manufacturer of certain formulations or required the use of special stabilizing additives, or resulted in an uneconomic loss of effectiveness with time. In many instances where base-sensitive pesticides were to be employed in wettable powder formulations special type acid carrier had to be employed.

The term "base sensitive" is not intended to limit the scope of this invention, but rather is used to explain its advantages. There is some disagreement in the technical literature as to the exact mechanism of decomposition or loss of activity of sensitive toxicants when combined with carriers. The various mechanisms discussed produce some correlations, but do not appear independently to explain the complete mechanism. The mechanisms of base decomposition, moisture, surface acidity, ion exchange capacity, and sorption capacity all have been discussed and all probably contribute to the loss of toxicant activity. Regardless of the mechanism, the techniques of this invention have been found to improve stability, and as used in the instant application and appended claims, the term base sensitive includes all such contributing mechanisms.

In the past one of the most successful carriers has been the synthetic alkaline earth silicates, e.g., calcium silicates, and particularly the hydrothermally prepared silicates. These products have had the advantages of high absorptive capacity, light bulk density, and high uniformity. These materials have not been completely satisfactory, however, since they meet with the same criticism of not being completely inert and therefore somewhat unstable with certain toxicants.

On occasion, when base-sensitive pesticides have been contemplated for wettable powder formulations, it has been necessary to supply carriers that were known to be acidic or having a pH no higher than neutral. Unfortunately the acidic carriers do not possess all of the necessary characteristics mentioned above. In many instances the products, when formulated on an acidic carrier, are excessively phytotoxic, have very low absorptivity characteristics, or both.

Consequently, the art has had a definite need for an absorptive carrier that does not react with, catalyze a reaction of, or prevent the release of the toxicant or other formulation ingredients.

One of the more recent attempts to overcome this basicity difficulty is illustrated by British Pat. No. 895,992. Therein it is proposed to treat a specific class of reacted calcium silicates with carbon dioxide in order to reduce the basicity of the silicates. These materials, while representing improved stability, are, however, still not as satisfactory as desired by the industry.

It is therefore a principal object of this invention to provide base materials with improved properties applicable to, but not necessarily limited to, improved stability with pesticidal toxicants and other ingredients of pesticidal formulations.

It is another object of this invention to develop an economic method of producing a group of carrier materials with improved and controllable properties.

Still another object of the present invention is to provide a pesticidal carrier suitable for a wide range of pesticides, both liquid and solids, that are known to be base-sensitive.

It is a further object of this invention to provide a highly absorptive pesticidal carrier that does not adversely affect the pesticidal activity of the pesticide it carries, and which, when employed to produce a wettable powder, yields free-flowing product possessing excellent stability, and satisfactory wettability and suspendibility.

It has been discovered that the foregoing objects may be satisfied, and the above discussed disadvantages overcome by a modification of the hydrothermal reaction of a silica source, e.g., diatomaceous silica, quartz, and silica gel and a calcium oxide source, e.g., slacked lime, by introducing carbon dioxide during this reaction to produce a carbonated calcium silicate and/or an intimate mixture of very finely divided silica plus calcium carbonate. By controlling the ratios of lime to silica, the temperature of reaction, and time and duration of admitting carbon dioxide, products of various different properties can be produced.

The prior art has shown various methods by which a silica source and a lime source can be hydrothermally reacted to produce various synthetic calcium silicate products. U.S. Letters Pat. Nos. 1,574,363, to Calvert, 2,966,441 to Vander Linden et al., and 3,033,648 to Vander Linden are illustrative of such prior art. Moreover, carbonated calcium silicate products produced by the method of the British patent noted above with low concentrations of carbon dioxide reacted with previously prepared silicates give improved stability of the active ingredients of pesticidal formulations.

It has now been discovered that carbonated products containing 10–25 percent $CO_2$ prepared from materials with $CaO/SiO_2$ mol ratios of between 0.1:1.0 and 1.0:1.0 and preferably between 0.4 and 0.6, and having bulk densities of 5.0 to 12.0 lbs./cu. ft. give surprisingly superior stability than the corresponding calcium silicates without carbonation or those previously prepared silicates treated at lower levels of carbonation. While the above bulk density range is adequate for most products contemplated by this invention, it may vary as high as 25 lbs./cu. ft.

More specifically, this process involves a hydrothermal reaction wherein the $CaO/SiO_2$ molar ratio of lime to silica ranges between 0.1:1.0 and 1.0:1.0 at solids concentrations of between 0.2 and 2.0 lbs./gal. and preferably between 0.5 and 0.7 lbs./gal. Reaction temperatures, at corresponding saturated stream pressures, between 220° and 600° F. may be used, but temperatures between 370° F. and 460° F. are preferred. Carbon dioxide vapor, or liquid which rapidly converted to vapor, is passed through the reactants. The carbon dioxide is preferably admitted for periods of 30 minutes to 120 minutes starting at the time to lime-silica slurry reached reaction temperature, however, it may be introduced at other times for a time up to 120 minutes. The teachnique is applicable to both continuous and batch process and the reaction may be up to 6 hours for duration.

The product of the instant invention is quite distinctive and different from either the hydrothermally prepared silicates and the products carbonated after the hydrothermal reaction. The carbonation of the instant invention takes place in the $CoO/SiO_2$ reaction slurry and results in an intimate physical mixture (cannot be separated by physical means) of individual and distinct particles of silica and calcium carbonate. It is believed the size characterization of the particles is a result of the reaction occurring in the slurry which permits the crystalline growth of the individual ingredients. On the other hand, the carbonation of previously hydrothermally reacted silicates is different as it occurs in a dry state and is apparently in situ surface reaction of the $CO_2$ and silicate, with no opportunity for crystal growth which produces an intimate mixture of extremely small indistinguishable particles.

The invention may be further understood by reference to the following examples, wherein all parts are by weight, unless otherwise indicated.

EXAMPLE I

A 375 gallon agitated autoclave was preheated with saturated steam injection until it reached 480 p.s.i.g. and 460° F. After draining the condensate, 158 lbs. of pulverized diatomaceous silica slurried in 90 gallons of water were pumped into the reactor and steam was admitted to heat the contents to about 430° F. Eighty-eight lbs. of slaked lime slurried in 80 galllons of water were then pumped into the reactor followed by 20 gallons of flush water. The reactor was then charged with an 0.5/1.0 $CaO/SiO_2$ mol ratio slurry at about 0.7 lbs./gal. solids content including expected condensate accumulation. Steam was admitted during and after the addition of the lime and water. It took approximately 15 minutes to add the lime and water and another 40 minutes to reach 460° F. Then carbon dioxide was admitted through the bottom of the reactor at 450–460 p.s.i.g. and allowed to continue flowing into the reactor, maintaining the head vapor space pressure at 450 p.s.i.g. After 120 minutes, the carbon dioxide was turned off and the reactor drained through a heat exchanger. The reactant slurry was filtered, dried, and pulverized.

EXAMPLE II

Another batch reaction was made following the general technique in Example I. After taking 15 minutes to add the lime and water, it took another 15 minutes to reach the reaction temperature of 445° F. Sixty minutes after reaching 450° F., carbon dioxide was admitted at 450–460 p.s.i.g. and allowed to continue flowing into the reactor, maintaining the head vapor space pressure at 450 p.s.i.g. After 60 minutes, the carbon dioxide was turned off and the reactor drained through a heat exchanger. The reactant slurry was filtered, dried, and pulverized.

EXAMPLE III

Another batch reaction was made as in Example I through the addition of the lime and water. The lime and water were added for 15 minutes and it then took 10 minutes to heat the reactor to 450° F. Further steam addition was used to raise the temperature to 460° F. After 50 minutes, 20 gallons of water were added over a 10-minute period while the vapor space was blown down to a pressure of 340 p.s.i.g. Carbon dioxide was then added at 450–460 p.s.i.g., to bring the pressure back up to 450 p.s.i.g. A greater quantity of carbon dioxide went into the reactor due to the lower starting pressure. After 60 minutes, the carbon dioxide was turned off and the reactor drained through a heat exchanger. The reactant slurry was filtered, dried, and pulverized.

EXAMPLE IV

A 5-gallon agitated autoclave was charged with 820 grams of a pulverized diatomaceous silica slurried in 3 gallons of water. The reactor was heated to raise the slurry temperature to 370° F. Four-hundred fifty-two grams of slaked lime slurried with 1 gallon of water were then pumped into the reactor. This produced 0.5:1.0 $CaO/SiO_2$ mol ratio slurry of about 0.7 lbs./gal. solids content. After the reactor contents were reheated to 370° F., carbon dioxide was added at 200–250 p.s.i.g. to bring the reactor pressure up to 200 p.s.i.g. After 120 minutes, the carbon dioxide was turned off and the reactor drained through a heat exchanger. The product slurry was filtered, dried, and pulverized.

EXAMPLE V

Another batch reaction was made by the same method as Example IV, except that the carbon dioxide was added 60 minutes after the reaction materials reached 370° F. and was turned off after 60 minutes of addition. The reactor was drained through a heat exchanger and the product filtered, dried, and pulverized as before.

EXAMPLE VI

A batch reaction at 1.0:1.0 $CaO/SiO_2$ mol ratio was made by charging the 5-gallon reactor with 608 grams of pulverized diatomaceous silica slurried in 2 gallons of water. The reactor was heated to raise the slurry temperature to 450° F. Six-hundred sixty-four grams of slaked lime with 2 gallons of water were then pumped into the reactor. When the contents reached 450° F., carbon dioxide was added to bring the reactor pressure up to 500 p.s.i.g. After 120 minutes, the carbon dioxide was turned off and the reactor drained through a heat exchanger. The product was filtered, dried, and pulverized.

EXAMPLE VII

Another reaction was made by the same method as Example VI, except that the carbon dioxide was added 60 minutes after the reaction reached 450° F. and was turned off after 60 minutes of addition. The reactor was drained and the product filtered, dried, and pulverized as before.

EXAMPLE VIII

A 5-gallon agitated autoclave was charged with 820 grams of a pulverized diatomaceous silica slurried in 3 gallons of water. The reaction was heated to raise the slurry temperature to 450° F. Four-hundred fifty-two grams of slaked lime slurried with 1 gallon of water were pumped into the reactor to produce a 0.5:1.0 $CaO/SiO_2$ mol ratio slurry of about 0.7 lb./gal. solids content. After the reactor contents were reheated to 450° F., carbon dioxide was added at 450–500 p.s.i.g. to bring the reactor pressure up to 450 p.s.i.g. After 120 minutes the carbon dioxide was turned off and the reactor drained through a heat exchanger. The product slurry was filtered, dried, and pulverized.

EXAMPLE IX

Another batch reaction was made as Example VIII except that carbon dioxide was added 120 minutes after the reaction materials reached 450° F. and was turned off after 120 minutes of addtion. The reaction was drained through a heat exchanger and the product filtered, dried, and pulverized.

EXAMPLE X

Another batch reaction was made as Example VIII except that carbon dioxide was added 60 minutes after the reaction materials reached 450° F. and was turned off after 60 minutes of addition. The reactor was drained through a heat exchanger and the product filtered, dried, and pulverized.

EXAMPLE XI

This sample was not prepared by the instant invention but was prepared by atmospheric carbonation in the presence of moisture.

A 2-gallon column was filled with pulverized calcium silicate such as would result from Examples I, II, and III if no carbon dioxide were used. A steady stream of carbon dioxide was bubbled through two water bottles in series and after this humidification was passed through the column of pulverized calcium silicate. This process was continued for 860 hours. The treated powder was then removed from the column.

EXAMPLE XII

A 5-gallon agitated autoclave was charged with 820 grams of a pulverized diatomaceous silica slurried in 3 gallons of water. The reactor was heated to raise the slurry temperature to 360° F. Four hundred fifty-two grams of slaked lime slurried with 1 gallon of water were pumped into the reactor. This achieved a 0.5:1.0 $CaO/SiO_2$ mol ratio slurry of about 0.7 lb./gal. solids content. After the reactor contents were reheated to 360° F. the reaction was continued for 120 minutes. The reactor was then drained through a heat exchanger. Part of the warm slurry was placed in an agitated pressure unit and carbon dioxide added at 100 p.s.i.g. for 4 hours. The slurry was then filtered, dried, and pulverized.

EXAMPLE XIII

Another part of the slurry from Example XII was filtered, dried, and pulverized without addition of carbon dioxide.

The range of the products of the above examples are shown in Table 1. The prime advantage of the instant invention is in the range of product properties that can be obtained and that the carbonation occurs in the same reactor as part of the reaction of the feed diatomaceous silica and lime. The entire process is faster than can be accomplished by the separate steps, the latter as illustrated by Example XI. For purposes of comparison, Table 1 shows properties of the typical calcium silicates that are produced as illustrated by Examples XII and XIII when reactions are made as in the cited examples without the addition of carbon dioxide. It will be seen that the carbonation process modifies the properties to give lower pH values and water absorptions.

TABLE 1.—PROPERTIES OF PRODUCTS OF EXAMPLES 1 TO 13

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Loose weight, lb./cu. ft | 11.3 | 5.9 | 6.3 | 10.9 | 9.8 | 8.3 | 10.7 | 10.3 | 5.6 | 8.2 | | | 7.3 |
| Wet density, lb./cu. ft | 20.6 | 11.3 | 13.0 | 19.7 | 16.9 | 23.7 | 23.2 | | | | | | |
| pH | 8.8 | 8.5 | 8.15 | 8.5 | 8.5 | 8.5 | 8.45 | 8.2 | 8.3 | 8.5 | 8.5 | 9.3 | 9.4 |
| Water absorption, percent | 214 | 436 | 344 | 204 | 250 | 171 | 155 | | | | | | |
| $CO_2$ content, percent | 18.4 | 16.3 | 17.1 | 17.6 | | 24.2 | 23.9 | 17.7 | 13.5 | 15.4 | 15.0 | 9.9 | 1.4 |

The carbonated calcium silicates or intimate mixtures of silica, calcium carbonate, and calcium silicate that result from carbonation of calcium silicates were tested for stability with an organic phosphate pesticide sold under the trademark Malathion. Samples containing 30 to 55 percent Malathion pesticide impregnated on the powdered carrier were given accelerated storage stability tests at 40° C. The pesticide content of the samples was analyzed spectrophotometrically at the start and after 1, 2, 3 and 7 months storage at 40° C.

The following test procedure was used to determine the pesticide content in wettable powders:

Two-tenths grams of the power was placed in a 500 ml. volumetric flask. Twenty ml. of water was added and the sample shaken for 5 minutes. One hundred ml. of 95 percent ethanol was added and the sample shaken for 5 minutes. Sufficient ethanol was added to dilute the sample to the 500 ml. mark. After a 20 minute waiting period, with frequent shaking, a 25 ml. aliquot was transferred to a 100 ml. volumetric flask and diluted to volume with ethanol. Twenty-fiive ml. of the above sample was placed in a 250 ml. separatory funnel to which was added 2 mls. of 5N NaOH and 75 ml. of ferric reagent. After 5 minutes 50 mls. of carbon tetrachloride and 2 mls. of 1 percent copper sulfate was added. The sample was shaken for 1 minute. The lower layer was measured at 420 mu. CCl/4 standard, with a Beckman DU Spectrophotometer. The amount of pesticide was determined from a standard curve.

Table 2 presents the results of the above test on the examples.

In order to demonstrate the effective nature of the instant invention, a comparison was made of representative examples of (a) the instant invention, (b) a non-carbonated calcium silicate, i.e., Example XIII, and (c) a product resulting from the carbonation of a laboratory prepared calcium silicate (in accordance with the teaching of the above-mentioned British patent), i.e. Example XII. It can be seen that carbonation in the range of 13 to 18 percent $CO_2$ gives highly significant improvement in the Malathion stability as compared to the materials with less than 10.0 percent $CO_2$.

TABLE 2.—MALATHION PHOSPHATE PESTICIDE STABILITY TESTS AT 40° C. CALCIUM SILICATE CARRIER

| Example | 4 | 8 | 9 | 10 | 11 | 12 | 13 | 14 |
|---|---|---|---|---|---|---|---|---|
| Carrier: | | | | | | | | |
| Bulk density lb./cu. ft | 10.9 | 10.3 | 5.6 | 8.2 | | | 7.3 | 5.8 |
| pH | 8.5 | 8.2 | 8.3 | 8.5 | 8.5 | 9.3 | 9.4 | 8.9 |
| CO₂ content, percent | 17.6 | 17.7 | 13.5 | 15.4 | 15.0 | 9.9 | 1.4 | 1.4 |
| Initial pesticide | 39.2 | 39.2 | 43.6 | 36.8 | 53.2 | 47.2 | 48.0 | 51.6 |
| Percent Lost at 1 month | 0.0 | 0.0 | 1.8 | 0.0 | 0.0 | 31.4 | 38.3 | 23.2 |
| 2 months | 1.0 | 0.0 | 1.8 | 0.0 | 0.0 | 44.2 | 58.3 | 31.8 |
| 3 months | | 0.0 | 1.8 | 0.0 | 0.0 | 48.4 | 70.0 | 37.2 |
| 7 months | | | | | 2.0 | | | |

The effect of carbonation of calcium silicates was also tested by evaluating their effect on the color stability of 1 naphthyl N-methylcarbomate, hereafter referred to by its trademark designation Sevin Insecticide. Samples containing 50 percent Sevin Insecticide ground with 50 percent of the powdered carrier were given accelerated storage stability tests at 68° C. The occurrence of a reaction was observed by a color change from normal to pink or later darker shades of purple or violet.

Table 3 shows the observed results of examples prepared as described above. For comparison examples were included of the calcium silicates prior to carbonation. It can be seen that carbonation in the range of 13 to 25 percent $CO_2$ gives definite improvement in the color stability of Sevin Insecticide as compared to the materials with little or no carbonation.

TABLE 3.—SEVIN INSECTICIDE COLOR STABILITY TESTS AT 68° C.

| | Example | | | | | Uncarbonated |
|---|---|---|---|---|---|---|
| | 6 | 7 | 8 | 9 | 10 | |
| Bulk density lb./cu. ft | 8.3 | 10.7 | 10.3 | 5.6 | 8.2 | 5.8 |
| pH | 8.5 | 8.45 | 8.2 | 8.3 | 8.5 | 8.9 |
| CO₂ content, percent | 24.2 | 23.9 | 17.7 | 13.5 | 15.4 | 1.4 |
| Color after 2 hours | (¹) | (¹) | (¹) | (¹) | (¹) | (¹) |
| 4 hours | (¹) | (¹) | (¹) | (¹) | (¹) | (²) |
| 6 hours | (¹) | (¹) | (¹) | (¹) | (¹) | (²) |
| 24 hours | (¹) | (¹) | (¹) | (⁵) | (¹) | (²) |
| 96 hours | (³) | (⁴) | (⁴) | | (⁴) | |

¹ No change.  ⁴ Light pink.
² Purple.  ⁵ Violet.
³ Pink.  ⁶ Violet.

While the new product has exhibited extremely good properties for use as a pesticide carrier, the product is capable of other uses, such as those generally associated with non-carbonated silicates, e.g., fillers, abrasive powders, and pigments.

It is believed the above provides a complete description of the invention in such manner as to distinguish it from other inventions and from what is old, and provides a description of the best mode contemplated of carrying out the invention and thereby complies with the Patent Statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

We claim:
1. A method of preparing a carbonated calcium oxide-silica product comprising, introducing carbon dioxide into a reaction slurry of a silica source and a calcium oxide source having a $CaO/SiO_2$ mol ratio of between 0.1:1 and 1:1 and a solids content between 0.2 and 2.0 pounds per gallon, and reacting said carbon dioxide, silica source and calcium oxide at a temperature between 220° F. and 600° F. for a time interval extending approximately from 30 minutes to 6 hours.

2. A method as defined in claim 1 wherein said carbon dioxide is present in an amount to provide a carbonated product having at least about 10% carbon dioxide.

3. A method as defined in claim 1 wherein diatomaceous silica and lime are reacted.

4. A method as defined in claim 3 wherein said reaction temperature is between 370° F. and 460° F. and said solids content is between 0.5 and 0.7 pounds per gallon.

5. A method as defined in claim 3 wherein the mol ratio is between 0.4 and 0.6.

6. A method as defined in claim 5 wherein the reaction is carried on at corresponding saturated steam pressures.

7. A method of preparing a carbonated calcium oxide-silica reaction product comprising, introducing carbon dioxide into a reaction slurry of a silica source and a calcium oxide source having a $CaO/SiO_2$ mol ratio of between 0.1:1 and 1:1 and a solids content between 0.2 and 2.0 pounds per gallon, and reacting said carbon dioxide, silica source, and calcium oxide at a temperature between 220° F. and 600° F. until a carbonated product containing about 10 to 25 percent $CO_2$ is obtained.

8. A method as defined in claim 7 wherein said carbon dioxide is introduced over a period of about 30 minutes to about 6 hours.

9. A method as defined in claim 7 wherein said carbon dioxide is introduced over a period of about 30 minutes to about 120 minutes.

10. A method as defined in claim 7 wherein said reaction temperature is between 370° F. and 460° F.

11. A composition prepared by the method of claim 1.

12. An insecticidal composition comprising an active insecticidal ingredient, and, as a carrier therefor, the composition of matter defined in claim 1.

References Cited

UNITED STATES PATENTS 2,966,441  12/1960  Vander Linden _____ 167—42
3,194,730  7/1965  Nemec et al. _____ 167—42

ALBERT T. MEYERS, Primary Examiner
V. D. TURNER, Assistant Examiner

U.S. Cl. X.R.
424—300, 357

PO-1050
(5/69)

UNITED STATES PATENT OFFICE
CERTIFICATE OF CORRECTION

Patent No. 3,553,321                    Dated January 5, 1971

Inventor(s)   Robert Zilli and Garth Coombs

It is certified that error appears in the above-identified patent and that said Letters Patent are hereby corrected as shown below:

Column 1, line 51, "carrires" should be --carriers--. Column 3, line 36, "molar" should be --molal--; line 55, "CoO/SiO$_2$" should be --CaO/SiO$_2$--. Column 4, line 4, "gall should be --gallons--. Column 5, line 44, "addtion" should --addition--. Column 6, line 46, "grams" should be --gram- Column 8, line 52, "claim 1" should be --claim 11--.

Signed and sealed this 28th day of December 1971.

(SEAL)
Attest:

EDWARD M. FLETCHER, JR.                ROBERT GOTTSCHALK
Attesting Officer                      Acting Commissioner of Pa